Patented Oct. 11, 1927.

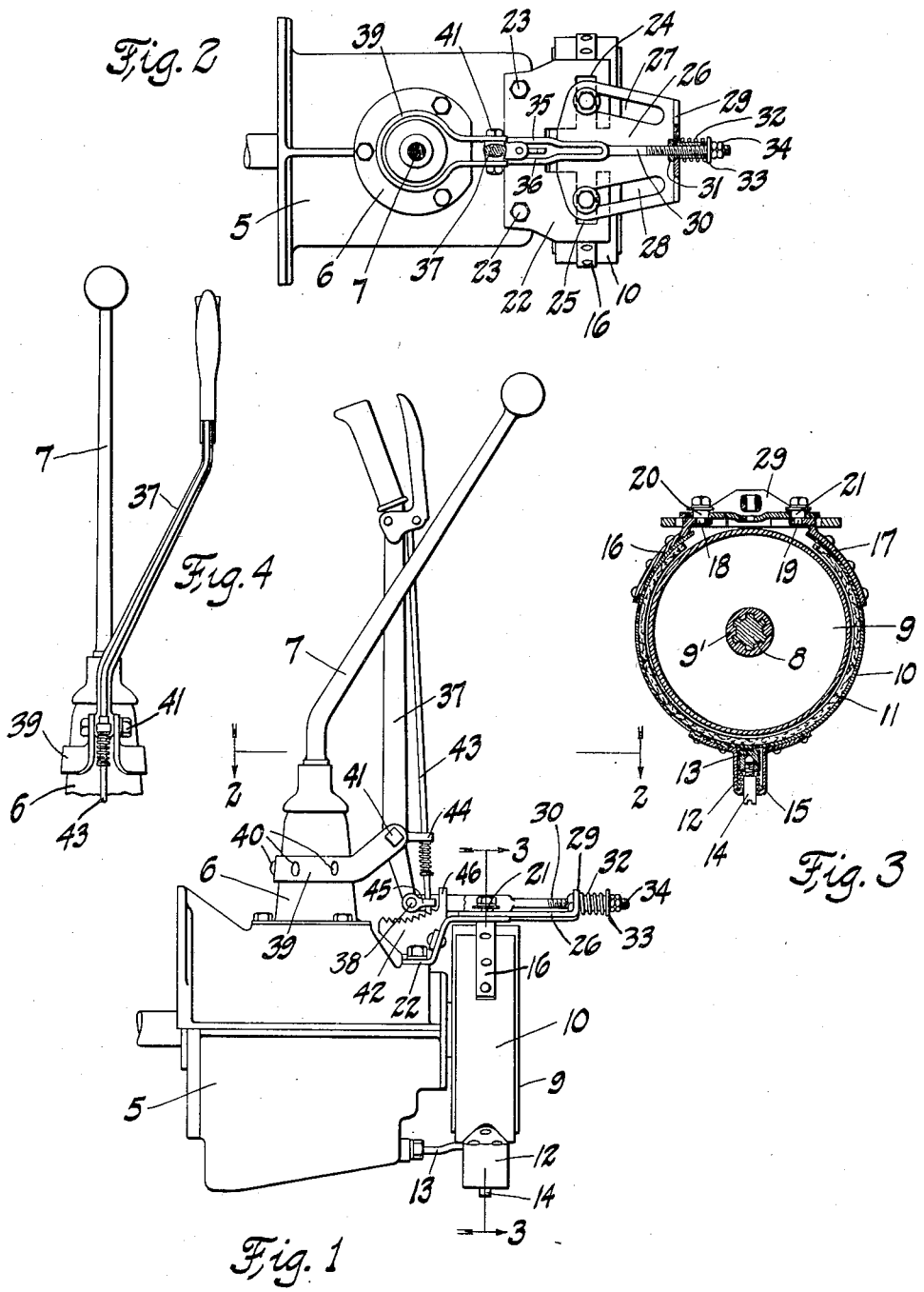

1,644,726

UNITED STATES PATENT OFFICE.

ORMOND E. HUNT, OF DETROIT, MICHIGAN, ASSIGNOR TO GENERAL MOTORS CORPORATION, OF DETROIT, MICHIGAN, A CORPORATION OF DELAWARE.

BRAKE MECHANISM FOR MOTOR VEHICLES.

Application filed April 20, 1923. Serial No. 633,471.

The invention relates to brake mechanism especially adapted for use in motor vehicles, and particularly to such mechanism designed for use in connection with the transmission mechanism of the vehicle.

While in some respects of more generic application, the brake mechanism is disclosed herein as applied to a brake drum mounted upon a transmission shaft immediately in the rear of a suitable form of change speed mechanism, the brake actuating and supporting parts being in turn supported upon the casing of such change speed mechanism.

The object of the invention is to improve and simplify the construction of brake mechanism of the type above mentioned, and to that end comprises various details and combinations of brake mechanism and actuating means therefor all as hereinafter more particularly described and set forth in the appended claims.

In the accompanying drawings, illustrating one embodiment of the invention.

Figure 1 is a side elevation of a change speed mechanism for motor vehicles having associated therewith one form of my improved brake mechanism;

Fig. 2 is a plan view taken on the line 2—2 of Fig. 1;
Fig. 3 is a section on line 3—3 of Fig. 1; and Fig. 4 is an end elevation of a portion of the mechanism shown in Fig. 1 looking from the rear or from the right hand side of Fig. 1.

Referring to the drawings, 5 indicates a transmission casing of a type commonly employed in connection with the speed changing mechanism of a motor vehicle, speed changing gears of any suitable character being mounted within the casing as is customary. Upon the upper side of the casing is mounted a dome 6 which serves as a cover for the casing and as a housing for the lower end of gear lever 7, the latter being connected in the usual manner to gear shifting mechanism within the casing.

In the usual form of change speed gearing the gear lever 7 will be mounted, as is illustrated, upon the center line of the gear casing in a direction fore and aft of the vehicle, the gear casing being usually secured to the engine casing or mounted immediately in the rear thereof in such manner that the gear lever may extend into the body of the vehicle in a position to be manipulated by the driver.

Projecting from the rear of the gear casing 5 is a transmission shaft 8 upon which is mounted, in accordance with the present invention, a brake drum 9. The shaft 8 will, of course, be arranged to be driven by the change speed mechanism in any usual or suitable manner and the brake drum 9 may, if desired, be adapted for supporting or for connection to a universal joint or other means of transmitting motion to the propeller shaft of the vehicle. The drum 9 may be secured to the shaft 8 so as to rotate therewith by any suitable means, as by spline connection between the hub 9' of the drum and the correspondingly shaped shaft 8.

Surrounding the brake drum 9 is a flexible band 10 provided with any suitable form of friction surface or lining 11. The band 11 is anchored to prevent movement with the drum, preferably at its lower or central portion, as by the U-shaped member 12 secured to the band and engaging over the extremity of a bracket 13 secured to the lower portion of the casing 5. The band is prevented from displacement axially of the drum by a screw 14 passing through an aperture in the U-shaped member 12 and engaging a screw threaded hole in the bracket 13. A spring 15 surrounding the screw 14 is arranged to exert pressure between the bracket 13 and the inner surface of the member 12, thereby tending normally to withdraw the brake band from engagement with the brake drum 9. The free extremities of the brake band 10, which are arranged preferably over the upper portion of the brake drum, are provided with projecting parts or brackets 16, 17 supporting respectively pins 18, 19 on which are journaled rollers 20, 21.

A supporting plate 22 is mounted upon the top of the transmission casing 5 and rigidly secured thereto, as by bolts 23, and extends outwardly over the upper portion of the brake drum 9. In the plane of the drum or parallel to its plane of rotation are slots 24, 25 in the plate 22 within which slots the extremities of brackets 16, 17 are positioned. The slots 24, 25 therefore serve as guide means, permitting movement of the extremities of the brake band toward and from the brake drum but preventing movement axially of the drum.

An actuating plate 26 rests upon the upper surface of the plate 22 in position to move freely in a direction transverse to the plane of the drum 9. The plate 26 is provided with slots 27, 28 converging toward the rear and within which the rollers 20, 21 are adapted to engage. The rear edge of the plate 26 is bent upwardly to form a flange 29 which is apertured to receive the operating rod 30. This rod is not secured fixedly to the flange 29, but is adapted to slide through the aperture in the flange between limits determined by the abutment 31 on the forward side of the flange and the spring 32 on the rearward side of the flange, the latter being retained by a collar 33 and nuts 34. Actuation of the rod 30, therefore, in a forward direction relative to the vehicle will apply a yielding pressure through the spring 32 to the flange 29 thereby tending to move the plate 26 forwardly and cause contraction of the brake band 10. Movement of the rod 30 in the opposite direction or rearwardly will apply pressure through the abutment 31 to cause positive expansion of the brake band, by which means, assisted by the spring 15, the band will be held normally out of engagement with the brake drum.

The rod 30 is divided or forked at its forward end to form branches 35, 36 which are disposed respectively upon opposite sides of and secured to the extremity of brake lever 37, as by bolt 38. The brake lever may be supported in any suitable manner in such position as to be accessible to the operator or driver. Preferably it is mounted, as shown, on the central plane of the transmission mechanism directly in the rear of the gear lever 7. One form of mounting suitable for this purpose comprises a band 39 secured, as by rivets 40, to the dome 6 of the transmission casing, the extremities of the band extending rearwardly to provide arms between which the brake lever is pivotally supported, as by bolt 41. This form of mounting is not specifically claimed herein, but made the subject matter of a copending application, Ser. No. 667,877, Patent 1,550,986, Smith, August 25, 1925.

Since the lever 37 is mounted upon the same plane fore and aft of the vehicle with the gear shifting lever 7, it will be seen that one lever would interfere with the movement of the other were their handle portions also in the same plane. To obviate this difficulty, the handle portion of lever 37 is preferably deflected, as shown in Fig. 4, to a position such that its path of movement will be at one side of the gear lever 7. The direction of deflection of lever 37 may be varied to accommodate it as desired either to a right hand or left hand type of drive.

Suitable means for locking the lever 37 in position to set the brake may be provided, which may comprise a notched segment 42 supported upon the plate 22 and adapted to engage with detent 43 mounted in guides 44, 45 on the lever 37. An abutment 46 may be formed at the end of the segment 42 to serve as a stop for lever 37 by engagement of the guide 45 therewith.

While I have herein illustrated the invention as applied to a brake actuated by a hand lever and ordinarily employed in a motor vehicle as an "emergency" brake, it will be understood that some features of the invention may be utilized in connection with other types of actuating mechanism, and, on the other hand, that some of the actuating mechanism herein disclosed may be employed with varied forms of brake elements. Various other changes in details of construction and operation may be made by one skilled in the art without departing from the spirit and scope of the invention, and therefore I do not desire to be limited to the specific construction herein disclosed except as required by the language of the appended claims in view of the prior art.

I claim:

1. Brake mechanism for motor vehicles comprising a transmission casing and a shaft, a brake drum associated with said shaft and positioned adjacent to said casing, a brake band surrounding said drum and having its ends positioned on the upper side of the drum, means movable longitudinally of the vehicle and adapted to apply said band to said drum, a gear lever mounted centrally of said casing, and a brake lever pivoted centrally of and above said casing, the lower end of said lever operatively connected to said brake applying means, the handle portion of said brake lever being laterally deflected so as to travel to one side of the path of said gear lever.

2. Brake mechanism for motor vehicles comprising a transmission casing, a shaft extending therefrom, a brake drum on said shaft, a brake band surrounding said drum with its extremities on the upper side of the drum, an anchor adapted to support said band at the central portion thereof, a supporting plate mounted upon said casing and having slots parallel to the plane of rotation of said drum, an actuating plate having converging slots transverse to said first-mentioned slots, the extremities of said band having projections extending through respective pairs of said slots whereby movement of said actuating plate axially of the drum causes contraction and expansion of said band, and means mounted centrally of said casing for moving said actuating plate.

3. Brake mechanism for motor vehicles comprising a transmission casing, a shaft projecting therefrom, a brake drum on said shaft, a brake band surrounding said drum with its extremities on the upper side of the drum, a fixed plate secured to said transmission casing and having means for guiding the extremities of the band toward and from said drum, a plate movable transversely of said drum and having means for expanding and contracting said band, and an actuating lever mounted on said casing and operatively connected to said movable plate.

4. Brake mechanism comprising a brake drum, brake members associated therewith having their free ends adjacent to each other, a frame member having slots parallel to the plane of rotation of said drum, a brake applying member having convergent slots positioned transversely of and crossing said first mentioned slots, means for moving said applying member transversely of said drum, and connecting devices associated with said free ends and said crossing slots to effect movement of the brake members toward and from the drum by transverse movement of said applying member.

In testimony whereof I affix my signature.

ORMOND E. HUNT.